May 1, 1928.  1,668,221
E. A. SPEEGLE
FOLDING BED AND LUGGAGE CARRIER FOR AUTOMOBILES
Filed Nov. 24, 1926   2 Sheets-Sheet 1
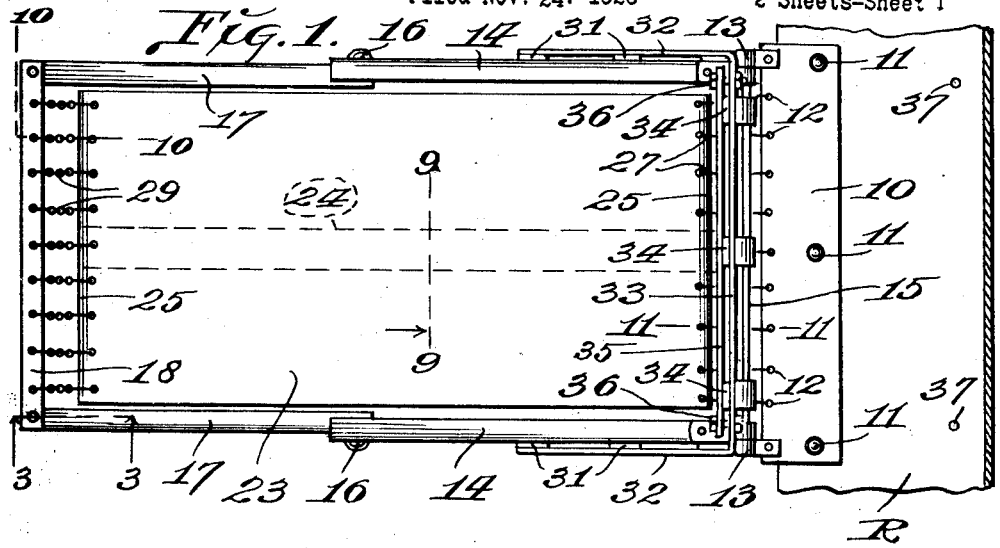
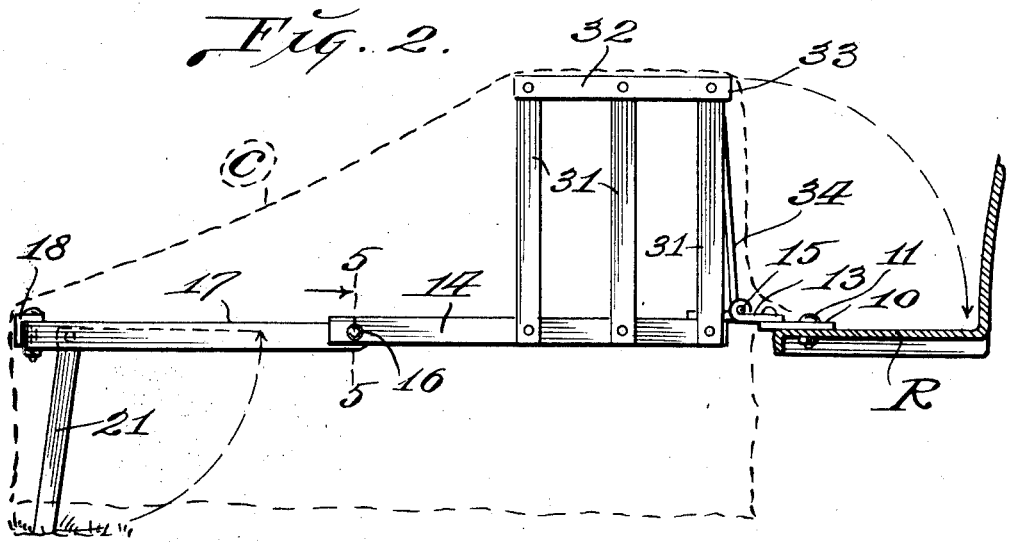
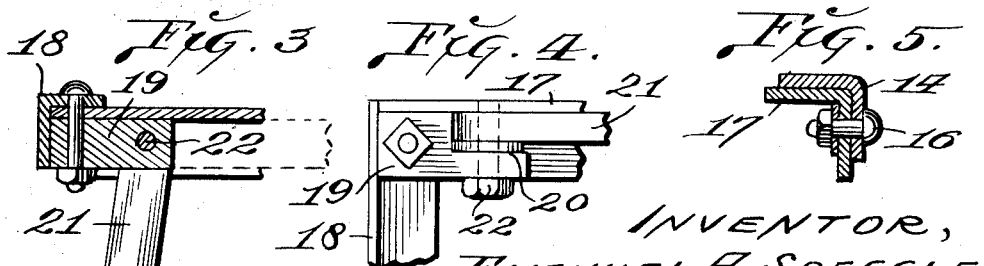
INVENTOR,
EMANUEL A. SPEEGLE
By Martin P. Smith, Atty.

May 1, 1928. 1,668,221
E. A. SPEEGLE
FOLDING BED AND LUGGAGE CARRIER FOR AUTOMOBILES
Filed Nov. 24. 1926 2 Sheets-Sheet 2
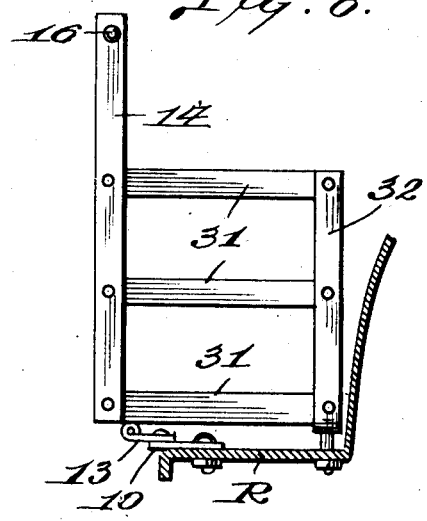
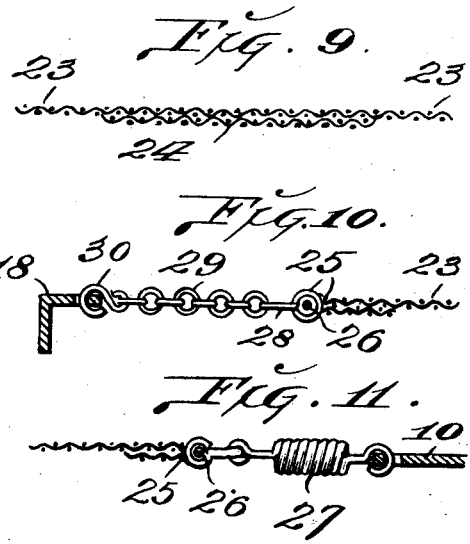
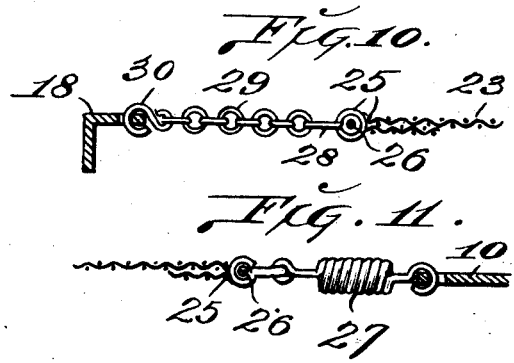
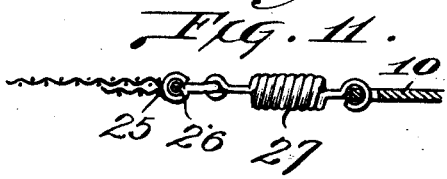
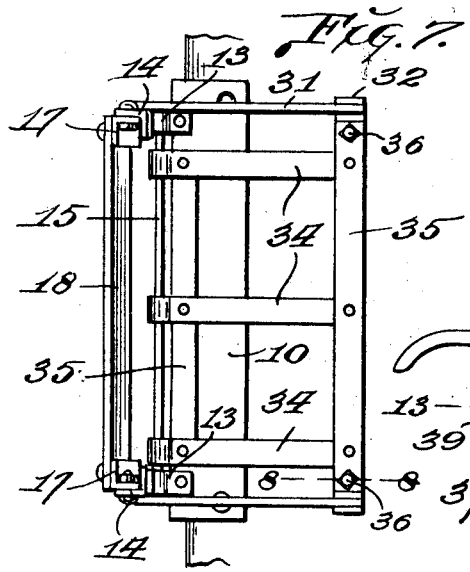
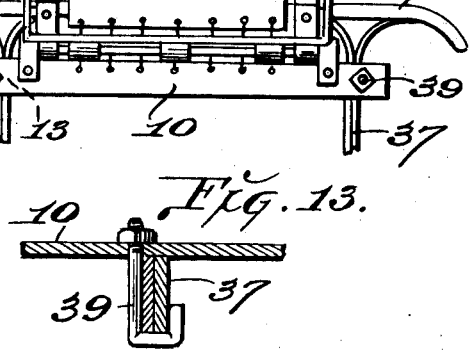
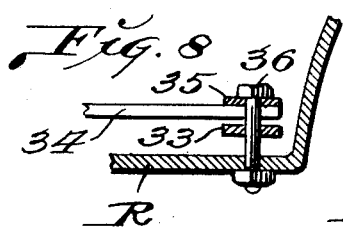
INVENTOR:—
EMANUEL A. SPEEGLE.
By Martin P. Smith Atty Patented May 1, 1928.

1,668,221

UNITED STATES PATENT OFFICE.

EMANUEL A. SPEEGLE, OF LOS ANGELES, CALIFORNIA.

FOLDING BED AND LUGGAGE CARRIER FOR AUTOMOBILES.

Application filed November 24, 1926. Serial No. 150,523.

My invention relates to a combined folding bed and luggage carrier for automobiles and the structure herein disclosed and claimed is an improvement upon a somewhat similar invention that was patented by me March 2, 1926, No. 1,575,015.

The principal objects of my present invention are to generally improve upon and simplify the construction of the folding bed disclosed in my aforesaid patent; to provide a folding structure that may be readily applied to an automobile, either to the front or rear bumper supports or to the running boards, which structure, when open, forms a bed frame which, when provided with bedding, may be used for sleeping purposes and which structure may be folded so as to provide a strong, substantial and commodious luggage carrier; and further, to provide a combined bed and luggage carrier of the character referred to that is relatively simple in construction, inexpensive of manufacture and which will be very effective in performing the functions for which it is intended.

With the foregoing and other objects in view, my invention consists in certain novel features of construction and arrangement of parts that will hereinafter be more fully described and claimed and illustrated in the accompanying drawings, in which—

Fig. 1 is a top plan view of a folding structure embodying the principles of my invention and which is folded so as to provide a bed frame.

Fig. 2 is a side elevational view of the structure in position to form a bed frame.

Fig. 3 is an enlarged detail section taken on the line 3—3 of Fig. 1.

Fig. 4 is a view looking against the underside of one corner of the bed frame and showing the means utilized for connecting one of the legs that supports the bed frame.

Fig. 5 is an enlarged cross section taken on the line 5—5 of Fig. 2.

Fig. 6 is an end elevational view of the structure folded to form a luggage carrier.

Fig. 7 is a plan view of the structure when folded to form a luggage carrier.

Fig. 8 is an enlarged detail section taken on the line 8—8 of Fig. 7.

Fig. 9 is an enlarged cross section taken on the line 9—9 of Fig. 1.

Fig. 10 is an enlarged cross section taken on the line 10—10 of Fig. 1.

Fig. 11 is an enlarged detail section taken approximately on the line 11—11 of Fig. 1 and showing the springs that form a connection between the fabric bed bottom and the head rail of the bed frame.

Fig. 12 is a plan view of an automobile bumper and showing the head or inner end portion of the folding structure applied thereto.

Fig. 13 is an enlarged cross section taken on the line 13—13 of Fig. 12.

Referring by numerals to the accompanying drawings which illustrate a practical embodiment of my invention, 10 designates a metal plate, preferably of suitable sheet metal, that is detachably secured, preferably by means of bolts 11, to the edge of the running board R of an automobile, one side edge of which plate projects a slight distance beyond the edge of the running board and formed in this projecting edge is a row of apertures 12.

Secured to the ends of plate 10 and projecting beyond the perforated edge thereof are the inner members of a pair of hinges 13 and the outer members of these hinges are secured respectively to angle bars 14 that form the inner parts of the side rails of a bed frame. A rod 15 connects the hinges 13 and the ends of said rod serve as axes or hinge pins for said hinges.

Connected to the outer ends of side rails 14 by transversely aligned, horizontally disposed pins or bolts 16, are the inner ends of said rail bed frame member 17, preferably angle bars, and the outer ends of these side rail members are connected by a transversely disposed foot rail 18, preferably an angle bar.

Secured to the outer ends of the rails 17 and on the undersides thereof, are metal blocks 19, portions of which are cut away to form notches 20 that receive the upper ends of folding legs 21 and which latter are connected to blocks 20 by horizontally disposed hinge pins or bolts 22. These legs are adapted to support the outer portion of the bed frame in a practically horizontal position and when folded, said legs occupy positions immediately beneath the side rail member 17 (see dotted lines, Figs. 2 and 3).

The bed bottom that is arranged in the folding bed frame just described comprises a section 23, preferably of heavy fabric such as canvas, and secured to the underside thereof is a centrally arranged longitudinally extending reinforcing strip 24 that prevents undue stretching of the intermediate portion of the bed bottom. The ends of the fabric bed bottom 23 are turned over to form hems 25 and positioned within the latter are small metal rods or wires 26. Engaged in the apertures 12 in the projecting edge of plate 10 are the inner ends of short retractile coil springs 27, the outer ends thereof being connected in any suitable manner to the wire or rod 26 in the hem in the inner end of the fabric bed bottom 23.

Engaging the wire rod 26 in the hem at the outer end of fabric bed bottom 23, are the inner ends of links 28, said links being connected to short chain sections 29, the outer ends thereof being provided with hooks 30 that engage in apertures formed in the foot rail 18 of the folding bed frame. The use of short chain sections between the outer end of the fabric bed bottom 23 and the foot rail 18 enables the fabric bed bottom to be maintained in the taut condition for, by shortening the chain sections 29, any slack that may occur in the fabric bed bottom may be readily taken up.

The structure heretofore described constitues the folding bed frame and the flexible bed bottom and the structure that combines with the inner portion of the folding bed frame and which serves as the frame of a luggage carrier which comprises a series of parallel side rails 31 that are secured to the inner portions of side rails 14 and which project vertically therefrom when said rail is in a horizontal position.

The upper ends of each set of side rails 31 are connected by the end portions of a rail or strap 32, the intermediate portion 33 of which extends from the inner one of the rails 31 on one side of the bed frame to the corresponding rail on the opposite side of the bed frame and which intermediate rail or strap 33 occupies a position parallel with the hinge rod 15.

Hinged to rod 15 just inside the hinges 13 and to the center of said rod are the lower ends of straps 34 and connecting the same adjacent to their upper and lower ends are transversely arranged straps 35. The hinged skeleton frame comprising the straps 34 and 35 constitutes a head member for the folding frame when the same is utilized as a bed and to retain said head member in a vertical position when the structure is used as a bed, the ends of the upper one of the horizontally disposed straps 35 are secured to the end portions of the intermediate portion 33 of the upper rails or straps 32 by bolts 36.

When the structure is folded and swung inwardly onto the running board to provide a luggage carrier as illustrated in Figs. 6 and 7, the bolts 36 pass through apertures 37 that are formed in the inner portion of the running board, thus firmly securing the folding structure in position thereupon (see Fig. 8).

Where my improved folding bed and luggage carrier is applied to a bumper structure, plate 10 is positioned on top of the supporting arms 37 that extend rearwardly or forwardly from the frame of the vehicle and which carry at their outer ends the bumper bar or bars 38. Plate 10 may be secured to the supporting bars 37 in any suitable manner, but preferably by means of hook or J-shaped bolts 39 as illustrated in Fig. 13.

When the folding structure as described is utilized for a bed frame, the outer section comprising rails 17 and 18 are swung outwardly so as to occupy a horizontal plane in alignment with the inner rails 14 and the supporting legs 21 are swung downward so as to support the outer portion of the frame. The skeleton rack or frame comprising straps 34 and 35 occupies a vertical position at the inner end of the bed frame and said rack is secured to member 33 by bolts 36. With the frame thus arranged, the fabric bed bottom 23 occupies a horizontal position and is adapted to receive blankets, quilts, pillows, and like bedding.

When the structure is used as a bed, a canopy or covering member C of water-proof material or of mosquito netting may be draped over the bed frame structure as illustrated by dotted lines in Fig. 2.

When the structure is folded to form a luggage carrier as illustrated in Figs. 6 and 7, legs 21 are swung upwardly into position beneath rails 17 and the inner portion of the bed frame structure including the side rails 14 are swung inwardly and upwardly until said members 14 occupy substantially vertical positions and with side rail members 17 folded inwardly against the upright members 14. When the structure is so folded, intermediate member 33 of strap or rail 32 lies directly on top of the running board R and the skeleton frame comprising parts 34 and 35 is now swung downwardly into a horizontal position and bolts 36 are inserted through aperture 37 to secure the folding structure in position to serve as a luggage carrier.

Thus it will be seen that I have provided a combined folding bed and luggage carrier for automobiles that is relatively simple in construction, light, strong and durable and which may be readily shifted from one position to another and which will serve as a convenient bed frame and bottom and also a convenient and commodious luggage rack or carrier.

It will be understood that minor changes in the size, form and construction of the various parts of my improved folding bed and luggage carrier may be made and substituted for those herein shown and described without departing from the spirit of my invention, the scope of which is set forth in the appended claims.

I claim as my invention:

1. In a folding bed and luggage carrier for automobiles, a plate adapted to be secured to the running board or bumper of an automobile, an inner frame hinged to one edge of said plate, an outer frame hinged to the outer portion of said inner frame, a fabric bed bottom flexibly connected to said plate and to the outer portion of said frame, a skeleton frame secured to and projecting upwardly from the inner portion of said inner frame and a skeleton frame hinged to the outer edge of said plate and adapted to occupy an upright position inside said upright skeleton frame.

2. In a folding bed and luggage carrier for automobiles, a plate adapted to be secured to the running board or bumper of an automobile, an inner frame hinged to one edge of said plate, an outer frame hinged to the outer portion of said inner frame, a fabric bed bottom flexibly connected to said plate and to the outer portion of said frame, a skeleton frame secured to and projecting upwardly from the inner portion of said inner frame, a skeleton frame hinged to the outer edge of said plate and adapted to occupy an upright position inside said upright skeleton frame and means for securing the free end of said hinged skeleton frame to the upper portion of the skeleton upright frame and to the vehicle to which the folding structure is applied.

3. In a folding bed and luggage carrier for automobiles, a plate adapted to be attached to the running board or bumper supporting arms of an automobile, a two-part folding bed frame hinged to said plate, a luggage carrying rack secured to the folding frame adjacent to the point where the same is hinged to said plate, a skeleton rack hinged to said plate and arranged within the luggage carrying rack, a fabric bed bottom arranged within the folding frame and flexible connections between the ends of said fabric bed bottom and the end portions of said folding frame.

In testimony whereof I affix my signature.

EMANUEL A. SPEEGLE.